US012571359B2

(12) United States Patent
Sweeney et al.

(10) Patent No.: US 12,571,359 B2
(45) Date of Patent: Mar. 10, 2026

(54) INLETS FOR GAS TURBINE ENGINE BYPASS DUCT HEAT EXCHANGERS

(71) Applicant: Rolls-Royce North American Technologies Inc., Indianapolis, IN (US)

(72) Inventors: Patrick C. Sweeney, Indianapolis, IN (US); Douglas J. Snyder, Indianapolis, IN (US); Kerry J. Lighty, Plainfield, IN (US); Scott Schwenker, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/779,824

(22) Filed: Jul. 22, 2024

(65) Prior Publication Data

US 2025/0043750 A1      Feb. 6, 2025

Related U.S. Application Data

(62) Division of application No. 18/228,267, filed on Jul. 31, 2023, now Pat. No. 12,071,913.

(51) Int. Cl.
| | |
|---|---|
| *F02K 3/075* | (2006.01) |
| *F02C 6/08* | (2006.01) |
| *F02C 7/14* | (2006.01) |
| *F02C 7/18* | (2006.01) |
| *F02K 3/06* | (2006.01) |
| *F02K 3/115* | (2006.01) |
| *F28D 21/00* | (2006.01) |

(52) U.S. Cl.
CPC ................ *F02K 3/075* (2013.01); *F02C 6/08* (2013.01); *F02C 7/14* (2013.01); *F02C 7/18* (2013.01); *F02C 7/185* (2013.01); *F02K 3/06* (2013.01); *F02K 3/115* (2013.01); *F05D 2260/213* (2013.01); *F28D 2021/0021* (2013.01)

(58) Field of Classification Search
CPC ...... F02C 6/08; F02C 7/14; F02C 7/18; F02C 7/185; F02K 3/06; F02K 3/075; F02K 3/115; F05D 2260/213; F28D 2021/0021
See application file for complete search history.

(56) References Cited

U.S. PATENT DOCUMENTS

| | | | |
|---|---|---|---|
| 1,712,622 A | 5/1929 | Franz | |
| 2,221,905 A | 11/1940 | Berlin | |
| 2,352,790 A | 7/1944 | Jordan | |
| 3,433,194 A | 3/1969 | Csupor | |
| 3,443,544 A | 5/1969 | Begizov | |
| 6,134,880 A | 10/2000 | Yoshinaka | |
| 6,270,309 B1 | 8/2001 | Ghetzler et al. | |
| 7,810,312 B2 * | 10/2010 | Stretton | .................... F02K 3/06 |
| | | | 60/785 |
| 8,020,298 B2 | 9/2011 | Campbell et al. | |

(Continued)

*Primary Examiner* — Jason H Duger
(74) *Attorney, Agent, or Firm* — Barnes & Thornburg LLP

(57) ABSTRACT

A bypass duct assembly for a gas turbine engine includes a bypass duct, a heat exchanger assembly, and an inlet cowl. The bypass duct is configured to direct bypass air around an engine core of the gas turbine engine. The heat exchanger assembly includes a heat exchanger located in the bypass duct and configured to transfer heat to the bypass air. The inlet cowl is coupled with the bypass duct and the heat exchanger assembly.

20 Claims, 3 Drawing Sheets

(56)                References Cited

U.S. PATENT DOCUMENTS

| | | | |
|---|---|---|---|
| 8,171,986 B2 | 5/2012 | Klein | |
| 9,045,998 B2* | 6/2015 | Lo | F02C 6/08 |
| 9,587,561 B2 | 3/2017 | Snyder et al. | |
| 10,253,691 B2* | 4/2019 | Afrianto | F02C 6/08 |
| 10,563,585 B2 | 2/2020 | Lord et al. | |
| 10,731,881 B2 | 8/2020 | Amr et al. | |
| 10,837,708 B2 | 11/2020 | Maucher et al. | |
| 10,989,071 B2 | 4/2021 | Walsh et al. | |
| 10,989,075 B2 | 4/2021 | Thangyah | |
| 11,035,295 B2 | 6/2021 | McGee et al. | |
| 11,262,144 B2 | 3/2022 | Breeze-Stringfellow et al. | |
| 11,459,949 B2 | 10/2022 | Modrzejewski | |
| 2007/0062679 A1 | 3/2007 | Agee et al. | |
| 2007/0295492 A1 | 12/2007 | Sharp et al. | |
| 2008/0017360 A1 | 1/2008 | Campbell et al. | |
| 2008/0053059 A1 | 3/2008 | Olver et al. | |
| 2009/0188234 A1* | 7/2009 | Suciu | F02K 3/115 60/39.83 |
| 2011/0150634 A1* | 6/2011 | Bajusz | F02K 3/115 62/84 |
| 2014/0290272 A1* | 10/2014 | Mulcaire | F04D 29/542 60/39.83 |
| 2016/0108814 A1* | 4/2016 | Schmitz | B23P 15/26 60/39.511 |
| 2016/0131035 A1* | 5/2016 | Diaz | F28D 7/08 165/96 |
| 2017/0159490 A1 | 6/2017 | Sennoun | |
| 2018/0355739 A1 | 12/2018 | Zysman | |
| 2019/0323429 A1 | 10/2019 | McGee et al. | |
| 2020/0271073 A1* | 8/2020 | Banham | F02K 3/115 |
| 2021/0047989 A1* | 2/2021 | Tan | F02M 26/32 |
| 2021/0071581 A1* | 3/2021 | Sodaro | F02C 9/18 |
| 2022/0260018 A1* | 8/2022 | Sidorovich Paradiso | F02C 7/18 |
| 2022/0356844 A1 | 11/2022 | Ayoub et al. | |
| 2025/0043695 A1* | 2/2025 | Lighty | F01D 25/243 |
| 2025/0043696 A1* | 2/2025 | Snyder | F01D 25/14 |
| 2025/0043724 A1* | 2/2025 | Lighty | F02C 7/141 |
| 2025/0043727 A1* | 2/2025 | Lighty | F02C 7/14 |

* cited by examiner

INLETS FOR GAS TURBINE ENGINE BYPASS DUCT HEAT EXCHANGERS

STATEMENT REGARDING FEDERALLY SPONSORED RESEARCH OR DEVELOPMENT

Embodiments of the present disclosure were made with government support under Contract No. FA8650-19-F-2078. The government may have certain rights.

CROSS-REFERENCE TO RELATED APPLICATIONS

This application claims priority to and the benefit of U.S. patent application Ser. No. 18/228,267, filed Jul. 31, 2023, the disclosure of which is now expressly incorporated herein by reference.

FIELD OF THE DISCLOSURE

The present disclosure relates generally to gas turbine engines, and more specifically to heat exchanger assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion reaction are exhausted out of the turbine and may provide thrust in some applications.

Gas turbine engines for aircraft typically include a fan and a bypass duct. The fan is driven by the turbine and pushes air through the bypass duct to create thrust for the aircraft. The bypass duct may include components configured to transfer heat between fluids and the air flowing through the bypass duct. It is desirable to improve the efficiency, manufacturability, and access to such components.

SUMMARY

The present disclosure may comprise one or more of the following features and combinations thereof.

In a first aspect of the disclosed embodiments, a bypass duct assembly for a gas turbine engine includes a bypass duct arranged circumferentially around a central axis of the gas turbine engine and configured to direct bypass air through the bypass duct. The bypass duct includes an outer wall defining an outer boundary of a flow path of the bypass air and an inner wall defining an inner boundary of the flow path of the bypass air. A heat exchanger assembly is arranged within the flow path and configured to transfer heat from a fluid passing through the heat exchanger assembly to a first portion of the bypass air while allowing a second portion of the bypass air to pass around the heat exchanger assembly. The heat exchanger assembly includes a heat exchanger that conducts the fluid therethrough and a vane box arranged around the heat exchanger to direct the first portion of the bypass air into the heat exchanger. The heat exchanger is coupled with the outer wall and extends radially inward from the outer wall toward the inner wall. An inlet cowl is located upstream of the heat exchanger assembly to collect the first portion of the bypass air and direct the first portion of the bypass air into the heat exchanger assembly. The inlet cowl is coupled with the vane box and has cowl duct that includes a first side wall that extends radially inward from the outer wall and a second side wall that extends radially inward from the outer wall and is spaced apart circumferentially from the first side wall.

In some embodiments of the first aspect, a portion of the heat exchanger assembly may extend radially inward beyond a radial terminating end of the cowl duct and the inlet cowl may further include a flow diverter that extends radially outward from the inner wall to the radial terminating end of the cowl duct to cover the portion of the heat exchanger assembly. The flow diverter may be formed to define a bow that guides the second portion of the bypass air around the heat exchanger assembly. The flow diverter may include a first radially extending surface that faces axially forward and a second radially extending surface that faces axially forward. The first radially extending surface and the second radially extending surface may diverge circumferentially as the flow diverter extends aft to define the bow. The first side wall and the second side wall of the cowl duct may each include a forward surface that extends generally radially only and an aft surface that extends radially outward as the aft surface extends axially aft away from the forward surface. The bow of the flow diverter may have an axially forwardmost tip and the cowl duct may be located axially aft of the forwardmost tip. The vane box may include a vane frame having a first side wall and a second side wall and a plurality of vanes that extend span-wise between the first side wall and the second side wall. The inlet duct may be configured to direct the first portion of the bypass air into the vane frame and through the plurality of vanes. The flow diverter may cover at least a portion of the vane frame when the bypass duct assembly is viewed axially looking aft.

Optionally, in the first aspect, the first side wall and the second side wall of the cowl duct may diverge circumferentially as the first side wall and the second side wall extend axially aft to lower a speed and increase a pressure of the first portion of the bypass air before it enters the heat exchanger. The first side wall and the second side wall may each extend at an angle of 15 degrees or less relative to the central axis. The heat exchanger may extend radially entirely between the outer wall and the inner wall.

In a second aspect of the disclosed embodiments, a bypass duct assembly for a gas turbine engine includes a bypass duct that includes an outer wall arranged around an axis and defining an outer boundary of a flow path of bypass air through the bypass duct and an inner wall defining an inner boundary of the flow path of the bypass air. A heat exchanger assembly that includes a heat exchanger is located in the bypass duct radially between the inner wall and the outer wall and a shroud is configured to direct a first portion of the bypass air into the heat exchanger and to direct a second portion of the air in the bypass duct around the heat exchanger. An inlet cowl is coupled with the shroud and has a cowl duct configured to collect the first portion of the bypass air and conduct the first portion of the bypass air into the shroud and an air plow that extends radially away from the shroud toward one of the inner wall and the outer wall. The air plow is formed to define a bow that guides the second portion of the bypass air around the heat exchanger assembly.

In some embodiments of the second aspect, the air plow may include a first radially extending surface that faces axially forward and a second radially extending surface that faces axially forward. The first radially extending surface and the second radially extending surface may diverge circumferentially as the air plow extends aft to define the bow. A portion of the heat exchanger assembly may extend radially inward beyond a radial terminating end of the cowl duct and the air plow may extend radially outward from the inner wall to the radial terminating end of the cowl duct to cover the portion of the heat exchanger assembly. The air plow may extend radially inward from the cowl duct to the inner wall. The heat exchanger may be coupled with the outer wall and may extend radially inward and axially forward away from the outer wall. The heat exchanger may extend radially inward to the inner wall. The cowl duct may include a first side wall that extends radially inward from the outer wall and a second side wall that extends radially inward from the outer wall and is spaced apart circumferentially from the second side wall.

In a third aspect of the disclosed embodiments, a method includes arranging a bypass duct circumferentially around a central axis of a gas turbine engine. The bypass duct includes an outer wall defining an outer boundary of a flow path of bypass air through the bypass duct and an inner wall defining an inner boundary of the flow path of the bypass air. The method also includes directing bypass air from an inlet of a gas turbine engine through the flow path. The method also includes arranging a heat exchanger in the bypass duct radially between the inner wall and the outer wall. The method also includes arranging a shroud in the bypass duct downstream from the inlet and upstream from the heat exchanger to direct a first portion of the bypass air into the heat exchanger and to direct a second portion of the bypass air in the bypass duct around the heat exchanger. The method also includes coupling an inlet cowl to the shroud upstream of the shroud. The inlet cowl has a cowl duct configured to collect the first portion of the bypass air and conduct the first portion of the bypass air into the shroud and an air plow that extends radially away from the shroud and toward one of the inner wall and the outer wall. The air plow is formed to define a bow that guides the second portion of the bypass air around the heat exchanger.

In some embodiments of the third aspect, the air plow may include a first radially extending surface that faces axially forward and a second radially extending surface that faces axially forward. The first radially extending surface and the second radially extending surface may diverge circumferentially as the air plow extends aft to define the bow. The heat exchanger may be coupled with the outer wall and extend radially inward and axially forward away from the outer wall. The heat exchanger may extend radially inward to the inner wall.

These and other features of the present disclosure will become more apparent from the following description of the illustrative embodiments.

DETAILED DESCRIPTION OF THE DRAWINGS

Figure 1:
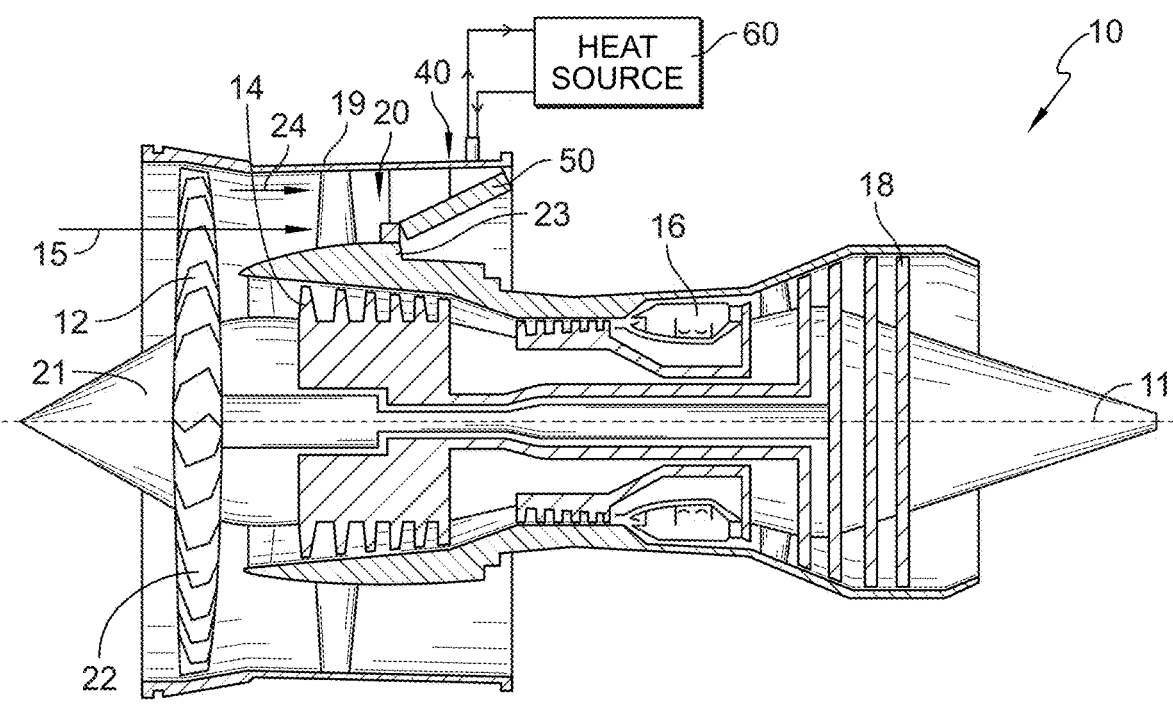
FIG. 1 is a section view of a gas turbine engine that includes a fan, an engine core, and a bypass duct assembly arranged around the fan and engine core, the engine core including a compressor, a combustor downstream of the compressor, and a turbine downstream of the combustor, and the bypass duct assembly including a bypass duct and a heat exchanger assembly configured to transfer heat from a fluid to the air flowing through the bypass duct.

For the purposes of promoting an understanding of the principles of the disclosure, reference will now be made to a number of illustrative embodiments illustrated in the drawings and specific language will be used to describe the same.

Referring to FIG. 1, an illustrative aerospace gas turbine engine 10 includes a fan assembly 12, a compressor 14, a combustor 16 located downstream of the compressor 14, and a turbine 18 located downstream of the combustor 16. The fan assembly 12 is driven by the turbine 18 and provides thrust for propelling the gas turbine engine 10 by forcing bypass air 15 through a bypass duct assembly 40. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 includes a fan 21 having a plurality of fan blades 22 that extend radially outward relative to the central axis 11. The plurality of fan blades 22 rotate about the central axis 11 to force the bypass air 15 through a flow path 24 such that the bypass air 15 is directed through the bypass duct 20 to provide thrust to propel the gas turbine engine 10.

The bypass duct assembly 40 includes a bypass duct 20 arranged circumferentially about the central axis 11 and is configured to direct the bypass air 15 through the bypass duct 20. The bypass duct 20 includes an outer wall 19 and an inner wall 23. The outer wall 19 defines a radially outer boundary of the flow path 24 of the bypass duct 20. An entirety of the bypass air 15 that bypasses the compressor 14, combustor 16, and turbine 18, flows between the outer wall 19 and the inner wall 23. The inner wall 23 defines a radially inner boundary of the flow path 24 of the bypass duct 20. The outer wall 19 is generally annular and extends about the central axis 11. In some embodiments, the outer wall 19 is segmented, partially segmented, or formed as a single ring that extends entirely circumferentially about the central axis 11.

In the illustrative embodiment, the gas turbine engine 10 further includes a heat exchanger assembly 50 located in the bypass duct 20. A portion of the bypass air 15 flowing through the flow path 24 passes through the heat exchanger assembly 50, and the heat exchanger assembly 50 transfers heat from a fluid passing from a heat source 60 through the heat exchanger assembly 50 to the bypass air 15. In some embodiments, the fluid from the heat source 60 is a gas, liquid, or mixture of both and may be a refrigerant, air, oil, fuel, etc., The heat source 60 may be electronics, the compressor, the turbine, fuel, oil, etc.

Figure 2:
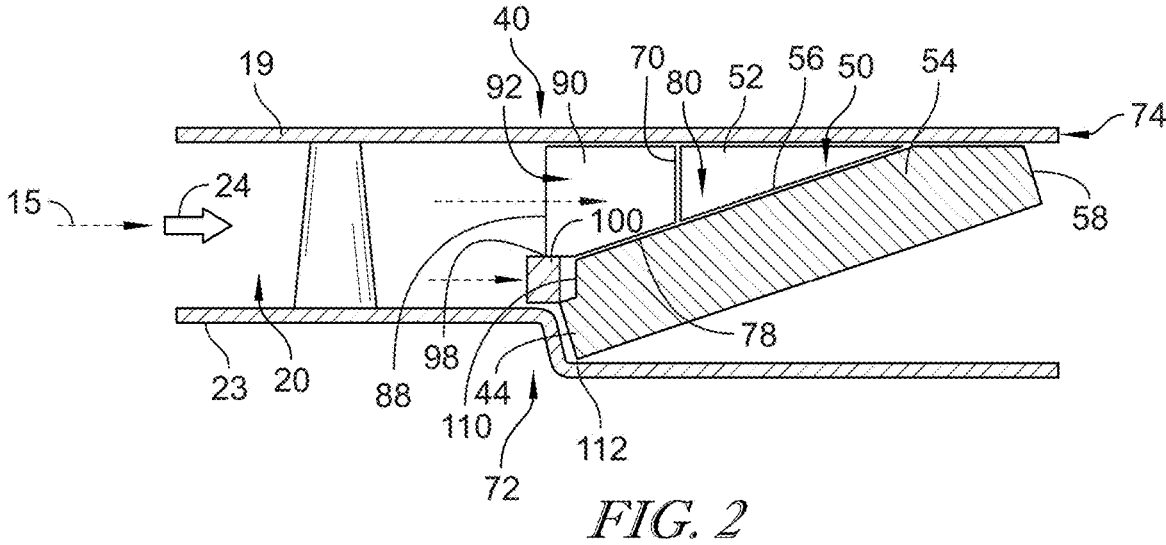
FIG. 2 is an enlarged diagrammatic section view of a portion of the bypass duct assembly of the gas turbine engine of FIG. 1, showing that the bypass duct assembly includes the bypass duct to direct bypass air from the inlet of the gas turbine engine and through the bypass duct, the heat exchanger assembly arranged in the bypass duct to transfer heat from the fluid passing through the heat exchanger assembly to a first portion of the bypass air, and an inlet cowl located upstream of the heat exchanger assembly to collect the first portion of the bypass air and direct the first portion of the bypass air into the heat exchanger assembly while allowing a second portion of the bypass air to pass around the heat exchanger assembly.
Figure 3:
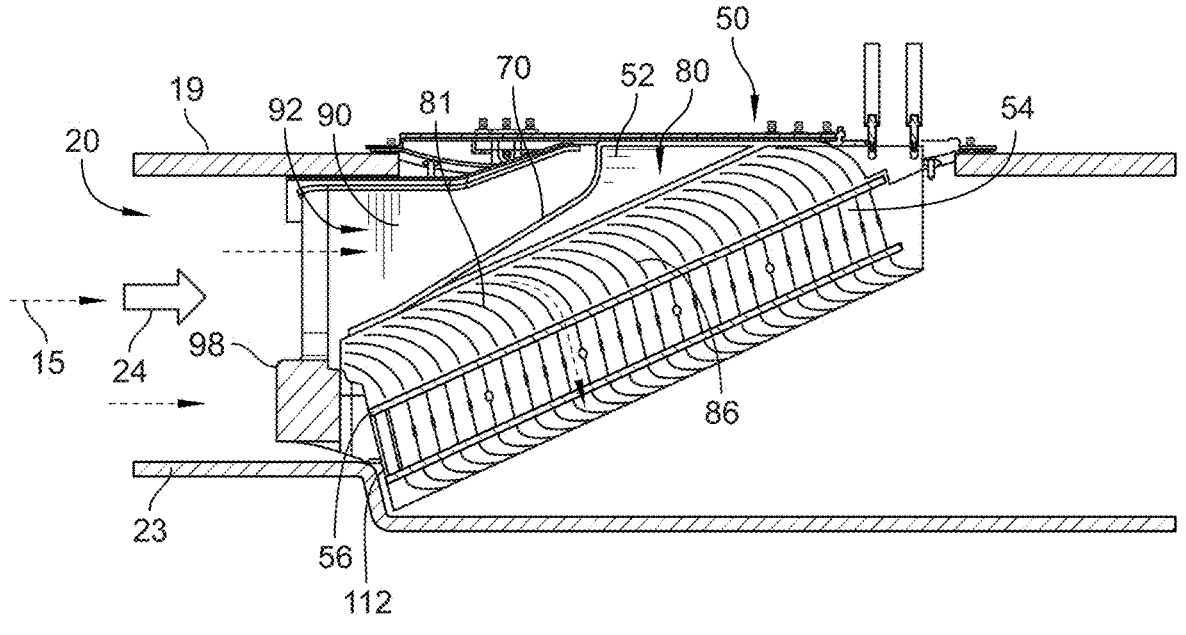
FIG. 3 is a detailed section view of the bypass duct assembly of FIG. 2 showing that the bypass duct includes an outer wall and an inner wall defining an outer boundary and inner boundary, respectively, of a flow path of the bypass air, the heat exchanger assembly includes a heat exchanger located radially between in the inner wall and the outer wall and a vane box configured to direct the first portion of the bypass air into the heat exchanger, and the inlet cowl includes a cowl duct coupled to the vane box to direct the first portion of the bypass air into the vane box and an air plow that extends from the vane box radially toward the inner wall to guide the second portion of the bypass air around the heat exchanger assembly.

Referring now to FIGS. 2-3, the heat exchanger assembly 50 includes an inlet vane box 52 (sometimes called a shroud) and a heat exchanger 54. The inlet vane box 52 is arranged forward of the heat exchanger 54 and configured to direct the bypass air 15 through the heat exchanger assembly 50 and, more specifically, through the heat exchanger 54. The heat exchanger assembly 50 extends partially circumferentially about the central axis 11 in the bypass duct 20. In some embodiments, more than one heat exchanger assembly 50 is circumferentially positioned in the bypass duct 20.

The inlet vane box 52 includes a first side wall 62 coupled with a first circumferential end 64 of the heat exchanger 54 to define a first circumferential end 42 of the inlet vane box 52. A second side wall 66 is spaced apart circumferentially away from the first side wall 62. The second side wall 66 is coupled with a second circumferential end 68 of the heat exchanger 54 to define a second circumferential end 46 of the inlet vane box 52. The first side wall 62 and the second side wall 66 cooperate to define a cavity 80 in the inlet vane box 52. The cavity 80 includes an inlet 70. The inlet 70 is positioned between an axially forward end 72 the heat exchanger assembly 50 and an axially aft end 74 of the heat exchanger assembly 50 so that the cavity 80 extends axially aft from the inlet 70 to the axially aft end 74 of the heat exchanger assembly 50.

The inlet vane box 52 collects a first portion of the bypass air 15 at the inlet 70 and directs the first portion of the bypass air 15 through the heat exchanger 54. That is, the first portion of the bypass air 15 passes through the inlet 70 and into the cavity 80. The first portion of the bypass air 15 exits the cavity 80 by passing through the heat exchanger 54. All air that enters cavity 80 goes through the heat exchanger 54 except for any leakage.

The inlet vane box 52 further includes a vane frame 81 having a plurality of vanes 86 extend span-wise between the first side wall 62 and the second side wall 66 as suggested in FIG. 3 in the illustrative embodiment. The plurality of vanes 86 extend circumferentially between the first side wall 62 and the second side wall 66. The vane frame 81 is configured to direct the first portion of the bypass air 15 from the inlet 70 through the heat exchanger 54. In some embodiments, the inlet vane box 52 omits the vanes 86 and acts as a simple shroud for directing the bypass air 15 into the heat exchanger 54.

The heat exchanger 54 conducts fluid therethrough. In some embodiments, the heat exchanger 54 includes a core having a plurality of tubes with or without air-side fins that pass the fluid from the heat source 60. The bypass air 15 is configured to flow over the plurality of tubes with or without air-side fins. In other embodiments, the heat exchanger 54 includes any design for exposing the fluid in the core to the bypass air 15. The heat exchanger 54 is coupled with the outer wall 19 and extends radially inward from the outer wall 19 toward the inner wall 23. The heat exchanger 54 also extends axially forward from the outer wall 19 to the inner wall 23.

The inlet vane box 52 extends over a radially outer surface 56 of the heat exchanger 54. In the illustrative embodiment, the inlet vane box 52 extends partially over the radially outer surface 56 of the heat exchanger 54. The inlet vane box 52 extends from an axially aft end 58 of the heat exchanger 54 axially forward toward an axially forward end 44 of the heat exchanger 54. In the illustrative embodiment, the inlet vane box 52 extends partially from the axially aft end 58 of the heat exchanger 54 axially forward toward the axially forward end 44 of the heat exchanger 54. In some embodiments, an axially distance that the inlet vane box 52 extends along the radially outer surface 56 of the heat exchanger 54 is modifiable to alter a pressure of the first portion of bypass air 15 entering the heat exchanger 54.

An inlet cowl 90 is located upstream of the heat exchanger assembly to collect the first portion of the bypass air 15 and direct the first portion of the bypass air 15 into the heat exchanger assembly. The inlet cowl 90 is coupled with the inlet vane box 52 and positioned forward of the inlet vane box 52. The inlet cowl 90 is fixed with the outer wall 19 and removably coupled with the inlet vane box 52 in the illustrative embodiment.

The inlet cowl 90 includes a cowl duct 92 that includes a first side wall 94 extending radially inward from the outer wall 19 and a second side wall 96 extending radially inward from the outer wall 19 and spaced apart circumferentially from the first side wall 94. The first side wall 94 and the second side wall 96 (shown in FIG. 4) of the cowl duct 92 each include a forward surface 88 that extends generally radially and circumferentially and an aft surface 78 that extends radially outward as the aft surface 78 extends axially aft away from the forward surface 88.

The cowl duct 92 is configured to collect the first portion of the bypass air 15 and conduct the first portion of the bypass air 15 into the inlet 70 of the inlet vane box 52. The cowl duct 92 is configured to direct the first portion of the bypass air 15 into the vane frame 81 and through the plurality of vanes 86 so that the first portion of bypass air 15 enters the heat exchanger 54.

The cowl duct 92 extends along the radially outer surface 56 of the heat exchanger 54 and the inlet vane box 52. In the illustrative embodiment, the cowl duct 92 extends partially over the radially outer surface 56 of the heat exchanger 54 and from the inlet vane box 52 axially forward toward the axially forward end 44 of the heat exchanger 54. In the illustrative embodiment, the cowl duct 92 extends from the inlet vane box 52 axially forward and past the axially forward end 44 of the heat exchanger 54. In some embodiments, an axially distance that the cowl duct 92 extends along the radially outer surface 56 of the heat exchanger 54 is modifiable to alter a pressure of the first portion of bypass air 15 entering the heat exchanger 54 through the inlet vane box 52.

The cowl duct 92 extends only partway radially inward from the outer wall 19 as shown in FIGS. 2 and 3. As such, a portion 110 of the heat exchanger assembly 50 extends radially inward beyond a radial terminating end 98 of the cowl duct 92. In the illustrative embodiment, the portion 110 of the heat exchanger assembly 50 includes a portion 112 of the heat exchanger 54. The cowl duct 92 may extend only partway radially inward from the outer wall 19 based on a desired flow area for an inlet of the cowl duct 92 and/or to control to a desired flow rate through the heat exchanger assembly 50.

Figure 4:
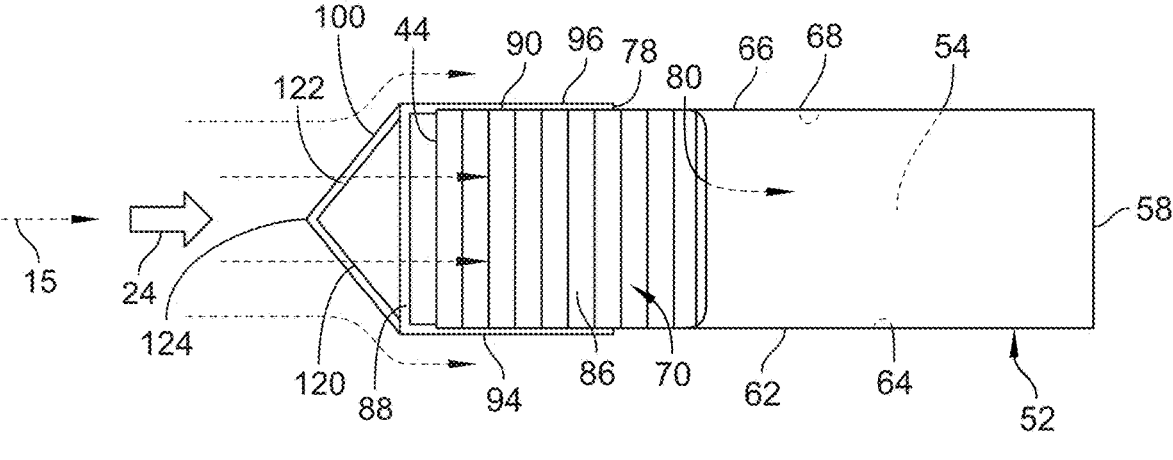
FIG. 4 is a radially inwardly looking diagrammatic view of the heat exchanger assembly of FIG. 3 suggesting that the cowl duct collects the first portion of the bypass air and that the air plow extends axially away from the cowl duct to direct the second portion of the bypass air around the heat exchanger assembly.

The inlet cowl 90 includes a flow diverter 100 that extends radially outward from the inner wall 23 to the radial terminating end 98 of the cowl duct 92 to cover the portion 100 of the heat exchanger assembly 50. In the illustrative embodiment, the flow diverter 100 includes a wedge-shaped air plow, as illustrated in FIG. 4. In some embodiments, the flow diverter 100 covers at least a portion of the vane frame 81 when the bypass-duct assembly 40 is viewed axially looking aft. The flow diverter 100 may be beneficial in designs where axial forward space ahead of the heat exchanger assembly 50 is limited. For example, a strut is located in the bypass duct 20 axially forward of the heat exchanger assembly 50 in the embodiments of FIGS. 2 and 3.

The flow diverter 100 extends axially forward from the inlet vane box 52. In the illustrative embodiment, the inlet cowl 90 extends radially inward from the outer wall 19 and the flow diverter 100 extends further radially inward from the inlet cowl 90 to the inner wall 23. In other embodiments, the inlet cowl 90 extends radially outward from the inner wall 23 and the flow diverter 100 extends radially outward from the inlet cowl 90 to the outer wall 19.

The flow diverter 100 includes a first radially extending surface 120 that faces axially forward from the portion 112 (shown in FIG. 2) of the heat exchanger 54 and a second radially extending surface 122 that faces axially forward from the portion 112 of the heat exchanger 54. The first radially extending surface 120 and the second radially extending surface 122 diverge circumferentially as the flow diverter 100 extends aft to define the bow as shown in FIG. 4. The bow of the flow diverter 100 has an axially forward-most tip 124. The flow diverter 100 extends radially inward from the cowl duct 92 to the inner wall 23 and the cowl duct 92 is located axially aft of the forwardmost tip 124.

In the illustrative embodiment, the first radially extending surface 120 and the second radially extending surface 122 are substantially planar and intersect at the forwardmost tip 124 to form a point. As such, the flow diverter 100 forms an air plow that diverts air circumferentially around the heat exchanger assembly 50. It will be appreciated that, in some embodiments, the first radially extending surface 120 and the second radially extending surface 122 are configured with any suitable shape for diverting the second portion of bypass air 15 around the heat exchanger assembly 50. For example, in some embodiments the flow diverter 100 is rounded or arced. The tip 124 may be located axially forward of the inlet cowl 90, aligned axially with the inlet cowl 90, or located axially aft of the inlet cowl 90.

The heat exchanger assembly 50 is configured to guide bypass air 15 into and around the heat exchanger 54 with minimal pressure drop and flow distortion. Without the flow diverter 100, the upstream ends of the vane frame 81 and heat exchanger 54 present a flat surface normal to the oncoming air flow which may cause pressure losses and interrupt the flow of the bypass air 15. The wedge shape of the flow diverter 100 guides airflow around these features that would otherwise stagnate on them. The flow diverter 100 is shaped to minimize pressure drop of the bypass air 15 flowing over and around it and to blend with the inlet cowl 90. The flow diverter 100 may be beneficial, as an example, in situations in place of a relatively long diffuser. A long diffuser may not include a blunt flat surface as presented here with the heat exchanger assembly 50. Even still, the inlet cowl 90 and the flow diverter 100 may allow for a smaller axial space claim as compared to a long diffuser design.

Figure 5:
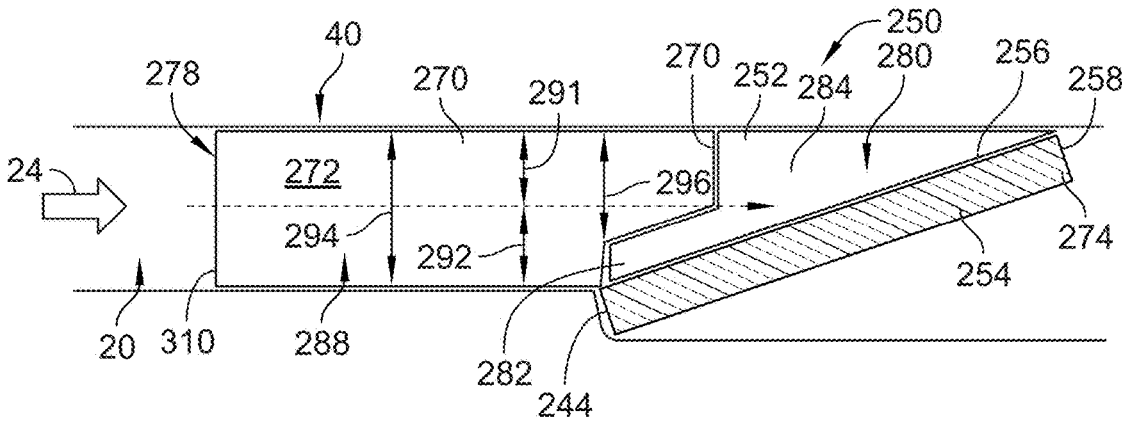
FIG. 5 is a section view of a portion of another embodiment of the bypass duct assembly of the gas turbine engine of FIG. 1, showing that the bypass duct assembly includes a bypass duct, a heat exchanger assembly arranged in the bypass duct to transfer heat from a fluid passing through the heat exchanger assembly to a first portion of the bypass air, and an inlet cowl located upstream of the heat exchanger assembly to collect and diffuse the first portion of the bypass air and direct the first portion of the bypass air into the heat exchanger assembly.
Figure 6:
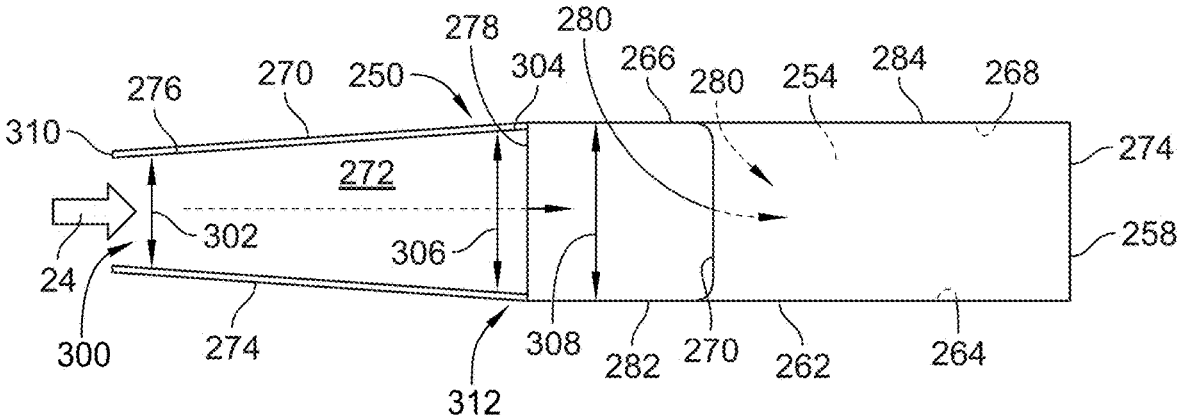
FIG. 6 is a radially inward view of the heat exchanger assembly of FIG. 5 showing that a first side wall and a second sidewall of the cowl duct diverge circumferentially as the first side wall and the second side wall extend axially aft to lower a speed and increase a pressure of the first portion of the bypass air before it enters the heat exchanger.

Referring now to FIGS. 5-6, another embodiment of a heat exchanger assembly 250 includes an inlet vane box 252 and a heat exchanger 254. The inlet vane box 252 is arranged around the heat exchanger 254 and configured to direct the bypass air 15 through the heat exchanger assembly 250 and, more specifically, through the heat exchanger 254. The heat exchanger assembly 250 extends partially circumferentially about the central axis 11 in the bypass duct 20. In some embodiments, more than one heat exchanger assembly 250 is circumferentially positioned in the bypass duct 20. The heat exchanger assembly 250 includes a cowl duct 272 that acts as a diffuser and omits the flow diverter 100 of the heat exchanger assembly 50 in the illustrative embodiment. The cowl duct 272 may be used in designs where axial forward space ahead of the heat exchanger assembly 250 allows. Even still, cowl ducts and flow diverters may be used alone or in combination in any suitable application with the heat exchanger assemblies 50, 250.

The inlet vane box 252 includes a first side wall 262 coupled with a first circumferential end 264 of the heat exchanger 254 to define a first circumferential end 282 of the inlet vane box 252. A second side wall 266 is spaced apart circumferentially away from the first side wall 262. The second side wall 266 is coupled with a second circumferential end 268 of the heat exchanger 254 to define a second circumferential end 284 of the inlet vane box 252.

The first side wall 262 and the second side wall 266 cooperate to define a cavity 280 in the inlet vane box 252. The cavity 280 includes an inlet 270. The inlet 270 is positioned between an axially forward end 278 the heat exchanger assembly 250 and an axially aft end 274 of the heat exchanger assembly 250 so that the cavity 280 extends axially aft from the inlet 270 to the axially aft end 274 of the heat exchanger assembly 250. The inlet vane box 252 collects a first portion of the bypass air 15 at the inlet 270 and directs the first portion of the bypass air 15 through the heat exchanger 254. That is, the first portion of the bypass air 15 passes through the inlet 270 and into the cavity 280. The first portion of the bypass air 15 exits the cavity 280 by passing through the heat exchanger 254.

The heat exchanger 254 conducts fluid therethrough. In some embodiments, the heat exchanger 254 includes a core having a plurality of tubes with or without air-side fins that pass the fluid from the heat source 60. The bypass air 15 is configured to flow over the plurality of tubes with or without air-side fins. In other embodiments, the heat exchanger 254 includes any design for exposing the fluid in the core to the bypass air 15. The heat exchanger 254 is coupled with the outer wall 19 and extends radially inward from the outer wall 19 toward the inner wall 23. The heat exchanger 254 also extends axially forward from the outer wall 19 to the inner wall 23.

The inlet vane box 252 extends over a radially outer surface 256 of the heat exchanger 254. In the illustrative embodiment, the inlet vane box 252 extends partially over the radially outer surface 256 of the heat exchanger 254. The inlet vane box 252 extends from an axially aft end 258 of the heat exchanger 254 axially forward toward an axially forward end 244 of the heat exchanger 254. In the illustrative embodiment, the inlet vane box 252 extends partially from the axially aft end 258 of the heat exchanger 254 axially forward toward the axially forward end 244 of the heat exchanger 254. In some embodiments, an axially distance that the inlet vane box 252 extends along the radially outer surface 256 of the heat exchanger 254 is modifiable to alter a pressure of the first portion of bypass air 15 entering the heat exchanger 254.

In the illustrative embodiment, a main body 284 of the inlet vane box 252 extends axially forward from the axially aft end 258 of the heat exchanger 254 to an axially forward portion 282 of the inlet vane box 252. The axially forward portion 282 of the inlet vane box 252 extends axially forward from the main body 284 toward the axially forward end 244 of the heat exchanger 254. The main body 284 extends a greater radial length 291 than a radial length 292 of the axially forward portion 282 of the inlet vane box 252. The main body 284 extends further radially outward than the axially forward portion 282 of the inlet vane box 252.

An inlet cowl 270 is located upstream of the heat exchanger assembly 250 to collect the first portion of the bypass air 15 and direct the first portion of the bypass air 15 into the heat exchanger assembly 250. The inlet cowl 270 is coupled with the inlet vane box 252. The inlet cowl 270 includes a cowl duct 272 that includes a first side wall 274 extending radially inward from the outer wall 19 and a second side wall 276 extending radially inward from the outer wall 19 and spaced apart circumferentially from the first side wall 274.

In the illustrative embodiment, the first side wall 274 and the second side wall 276 extend entirely radially from the outer wall 19 to the inner wall 23 and interconnect the outer wall 19 and the inner wall 23. In some embodiments, the first side wall 274 and the second side wall 276 extend partially between the outer wall 19 and the inner wall 23.

The first side wall 274 and the second side wall 276 of the cowl duct 272 diverge circumferentially as the first side wall 274 and the second side wall 276 extend axially aft to reduce the velocity of the air flow and to increase the pressure of the first portion of the bypass air 15 before it enters the heat exchanger 254. At a forward end 300 of the cowl duct 272, leading edges 310 of the first side wall 274 and the second side wall 276 are spaced a circumferential distance 302. At an aft end 304 of the cowl duct 272, trailing edges 312 the first side wall 274 and the second side wall 276 are spaced a circumferential distance 306 that is greater than the circumferential distance 302. In the illustrative embodiment, the circumferential distance 306 is substantially equal to a circumferential distance 308 between the first circumferential end 264 of the heat exchanger 254 and the second circumferential end 268 of the heat exchanger 254.

The cowl duct 272 includes a main body 288 and an axially aft portion 280 that extends aft of the main body 288. The main body 288 extends further radially inward than the axially aft portion 280. The main body 288 extends a radial distance 294 that is greater than a radial distance 296 of the axially aft portion 280. The axially aft portion 280 of the cowl duct 272 extends axially over the heat exchanger 254. The axially aft portion 280 extends radially outward from the heat exchanger 254. The axially aft portion 280 also extends over and radially outward from the axially forward portion 282 of the inlet vane box 252. The axially aft portion 280 of the cowl duct 272 and the axially forward portion 282 of the inlet vane box 252 extend axially relative to one another.

The full-length cowl duct 272 may minimize pressure drop from bypass air 15 flowing through and around a heat exchanger 254. The cowl duct 272 exit is sized to match the downstream heat exchanger width. In some embodiments, the length of the cowl duct 272 is sized so that the cowl duct 272 has an included angle of about 5 degrees to about 15 degrees. The sides 274, 276 of the cowl duct 272 have some finite thickness and an aerodynamic leading edge to minimize spillage losses at the leading edge 310 for the bypass air 15 that is flowing around the heat exchanger 254. A wall thickness of the outer surface of the cowl duct 272 (inside can be hollow) can be increased and extended along the heat exchanger 254. By doing so, a Mach number of the flow going between the heat exchanger 254 is increased and thus a static pressure on the downstream side of the heat exchanger 254 is decreased. This causes more bypass air 15 to flow through the heat exchanger 254, enabling greater heat rejection. The cowl duct 272 extends to the outer wall 19 and interfaces with the inlet vane box 252 which is attached to the angled heat exchanger 254.

A method of assembling a bypass duct assembly includes arranging a bypass duct circumferentially around a central axis of a gas turbine engine, wherein the bypass duct includes an outer wall defining an outer boundary of a flow path of bypass air through the bypass duct and an inner wall defining an inner boundary of the flow path of the bypass air. The method also includes directing bypass air from an inlet of a gas turbine engine through the flow path. The method also includes arranging a heat exchanger in the bypass duct radially between the inner wall and the outer wall. The heat exchanger can be coupled with the outer wall and extend radially inward and axially forward away from the outer wall. The heat exchanger can extend radially inward to the inner wall.

The method may also include arranging a vane box in the bypass duct downstream from the inlet and upstream from the heat exchanger to direct a first portion of the bypass air into the heat exchanger The method can also include coupling an inlet cowl to the vane box upstream of the shroud. The inlet cowl can have a cowl duct configured to collect the first portion of the bypass air and conduct the first portion of the bypass air into the vane box. The inlet cowl can have an air plow that extends radially away from one of the inner wall and the outer wall. The air plow can be formed to define a bow that guides the second portion of the bypass air around the heat exchanger. The leading edges 310 of the first side wall 274 and the second side wall 276 of the cowl duct also guide the second portion of the bypass air around the heat exchanger. The air plow can include a first radially extending surface that faces axially forward and a second radially extending surface that faces axially forward, wherein the first radially extending surface and the second radially extending surface diverge circumferentially as the air plow extends aft to define the bow.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A bypass duct assembly for a gas turbine engine, the bypass duct assembly comprising a bypass duct that includes an outer wall arranged around an axis and defining an outer boundary of a flow path of bypass air through the bypass duct and an inner wall defining an inner boundary of the flow path of the bypass air, a heat exchanger assembly that includes a heat exchanger located in the bypass duct radially between the inner wall and the outer wall and a shroud configured to direct a first portion of the bypass air into the heat exchanger and to direct a second portion of the bypass air in the bypass duct around the heat exchanger, and an inlet cowl coupled with the shroud and having a cowl duct configured to collect the first portion of the bypass air and conduct the first portion of the bypass air into the shroud and an air plow that extends radially away from the shroud toward one of the inner wall and the outer wall, and wherein the air plow is formed to define a bow that guides the second portion of the bypass air around the heat exchanger assembly.

2. The bypass duct assembly of claim 1, wherein the air plow includes a first radially extending surface that faces axially forward and a second radially extending surface that faces axially forward and wherein the first radially extending surface and the second radially extending surface diverge circumferentially as the air plow extends aft to define the bow.

3. The bypass duct assembly of claim 2, wherein the first radially extending surface and the second radially extending surface are substantially planar.

4. The bypass duct assembly of claim 1, wherein a portion of the heat exchanger assembly extends radially inward beyond a radial terminating end of the cowl duct and the air plow extends radially outward from the inner wall to the radial terminating end of the cowl duct to cover the portion of the heat exchanger assembly.

5. The bypass duct assembly of claim 1, wherein the air plow extends radially inward from the cowl duct to the inner wall.

6. The bypass duct assembly of claim 1, wherein the heat exchanger is coupled with the outer wall and extends radially inward and axially forward away from the outer wall.

7. The bypass duct assembly of claim 6, wherein the heat exchanger extends radially inward to the inner wall.

8. The bypass duct assembly of claim 1, wherein the cowl duct includes a first side wall that extends radially inward from the outer wall and a second side wall that extends radially inward from the outer wall and is spaced apart circumferentially from the second side wall.

9. The bypass duct assembly of claim 8, wherein the first side wall and the second side wall of the cowl duct diverge circumferentially as the first side wall and the second side wall extend axially aft to lower a speed and increase a pressure of the first portion of the bypass air before it enters the heat exchanger.

10. The bypass duct assembly of claim 9, wherein the first side wall and the second side wall each extend at an angle of 15 degrees or lest relative to the axis.

11. The bypass duct assembly of claim 9, wherein the heat exchanger extends radially entirely between the outer wall and the inner wall.

12. The bypass duct assembly of claim 1, wherein the bow of the air plow has an axially forwardmost tip and the cowl duct is located axially aft of the forwardmost tip.

13. The bypass duct assembly of claim 1, wherein the shroud includes a vane frame having a first side wall and a second side wall and a plurality of vanes that extend span-wise between the first side wall and the second side wall.

14. The bypass duct assembly of claim 13, wherein the cowl duct is configured to direct the first portion of the bypass air into the shroud and through the plurality of vanes.

15. The bypass duct assembly of claim 1, wherein the inlet cowl is fixed with the outer wall.

16. The bypass duct assembly of claim 15, wherein the inlet cowl is removably coupled with the shroud.

17. A method comprising arranging a bypass duct circumferentially around a central axis of a gas turbine engine, the bypass duct including an outer wall defining an outer boundary of a flow path of bypass air through the bypass duct and an inner wall defining an inner boundary of the flow path of the bypass air, directing bypass air from an inlet of the gas turbine engine through the flow path, arranging a heat exchanger in the bypass duct radially between the inner wall and the outer wall, arranging a shroud in the bypass duct downstream from the inlet and upstream from the heat exchanger to direct a first portion of the bypass air into the heat exchanger and to direct a second portion of the bypass air in the bypass duct around the heat exchanger, and coupling an inlet cowl to the shroud upstream of the shroud, the inlet cowl having a cowl duct configured to collect the first portion of the bypass air and conduct the first portion of the bypass air into the shroud and an air plow that extends radially away from the shroud and toward one of the inner wall and the outer wall, the air plow formed to define a bow that guides the second portion of the bypass air around the heat exchanger.

18. The method of claim 17, wherein the air plow includes a first radially extending surface that faces axially forward and a second radially extending surface that faces axially forward and wherein the first radially extending surface and the second radially extending surface diverge circumferentially as the air plow extends aft to define the bow.

19. The method of claim 17, wherein the heat exchanger is coupled with the outer wall and extends radially inward and axially forward away from the outer wall.

20. The method of claim 19, wherein the heat exchanger extends radially inward to the inner wall.

* * * * *